United States Patent
Hanson et al.

(10) Patent No.: US 6,715,783 B1
(45) Date of Patent: Apr. 6, 2004

(54) STROLLER AND STROLLER BASE WITH HEIGHT ADJUSTMENT CAPABILITY

(75) Inventors: Wayne H. Hanson, Bozeman, MT (US); Wade M. Wolf, Golden, CO (US); William B. Phelps, Bozeman, MT (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/697,552

(22) Filed: Oct. 26, 2000

Related U.S. Application Data
(60) Provisional application No. 60/162,533, filed on Oct. 29, 1999.

(51) Int. Cl.[7] .................................................. B62B 1/00
(52) U.S. Cl. ................................... 280/642; 280/47.38
(58) Field of Search ................................ 280/642, 643, 280/644, 647, 648, 649, 650, 47.38, 250.1, 304.1, 43, 43.17, 30; 297/118, 129, 188.5, 16.1, 16.2, 55; 5/81.1 R, 83.1, 86.1

(56) References Cited

U.S. PATENT DOCUMENTS

| | | | | |
|---|---|---|---|---|
| 2,976,912 A | * | 3/1961 | Dias | |
| 2,982,336 A | * | 5/1961 | Minici | 297/129 |
| 3,123,400 A | * | 3/1964 | Paulson | 297/55 |
| 3,290,050 A |   | 12/1966 | Ezquerra | 280/30 |
| 3,882,949 A | * | 5/1975 | Anderson | 180/8.2 |
| 4,239,259 A | * | 12/1980 | Martinez | 280/649 |
| 4,506,906 A |   | 3/1985 | Allden | 280/642 |
| 4,555,121 A | * | 11/1985 | Lockard et al. | 280/30 |
| 4,729,572 A |   | 3/1988 | Bergeron | 248/166 |
| 4,736,959 A |   | 4/1988 | Van Steenburg | 280/30 |
| 4,768,795 A |   | 9/1988 | Mar | 280/30 |
| 4,786,064 A | * | 11/1988 | Baghdasarian | 280/30 |
| 4,832,354 A | * | 5/1989 | LaFreniere | 280/30 |
| 4,934,723 A | * | 6/1990 | Dysarz | 280/250.1 |
| 4,946,180 A | * | 8/1990 | Baer | 280/43 X |
| 5,161,812 A | * | 11/1992 | DeWeese | 280/47.38 |
| 5,234,224 A | * | 8/1993 | Kim | 280/30 |
| 5,257,799 A |   | 11/1993 | Cone et al. | 280/642 |
| 5,601,302 A | * | 2/1997 | Beard et al. | 280/250.1 |
| 5,669,664 A |   | 9/1997 | Perego | 280/47.4 |
| 5,695,173 A | * | 12/1997 | Ochoa et al. | 254/122 |
| 5,820,144 A | * | 10/1998 | Wang | 280/47.38 |
| 5,865,447 A |   | 2/1999 | Huang | 280/30 |
| 5,947,555 A | * | 9/1999 | Welsh, Jr. et al. | 280/30 X |
| 6,032,975 A | * | 3/2000 | Hanson et al. | 280/647 |
| 6,086,086 A |   | 7/2000 | Hanson et al. | 280/650 |
| D436,899 S | * | 1/2001 | Suzuki | D12/129 |
| 6,270,111 B1 | * | 8/2001 | Hanson et al. | 280/650 |

FOREIGN PATENT DOCUMENTS

| | | | |
|---|---|---|---|
| DE | 4025009 A1 | | 2/1992 |
| DE | 4114252 | * | 11/1992 |
| EP | 0 939 019 A1 | | 9/1999 |
| RU | 1761140 | * | 9/1992 |

* cited by examiner

Primary Examiner—Bryan Fischmann
(74) Attorney, Agent, or Firm—MacMillan, Sobanski & Todd, LLC

(57) ABSTRACT

A stroller and a stroller base suitable for use with handicapped children. A seat assembly is removably attached to a stroller base for adjustment between upright and tilted positions. The stroller base has an adjustable height mechanism for positioning the seat assembly at positions from near the floor to table height. Optionally, the seat assembly may be releasably mounted on a second base for tilting adjustment between upright and tilted positions. The first base may be designed primarily for indoor use and the second base may be designed primarily for pushing and for outdoor uses.

8 Claims, 13 Drawing Sheets

STROLLER AND STROLLER BASE WITH HEIGHT ADJUSTMENT CAPABILITY

CROSS-REFERENCE TO RELATED APPLICATIONS

This application claims priority to U.S. Provisional Application Serial No. 60/162,533, filed Oct. 29, 1999.

STATEMENT REGARDING FEDERALLY SPONSORED RESEARCH OR DEVELOPMENT

Not Applicable.

1. Technical Field of the Invention

This invention relates in general to a stroller, and in particular, to a stroller and to an indoor stroller base with a tilt-in-space capability for selecting a desired recline angle of a seat assembly and with a height adjustment for selective positioning the seat assembly between a lower position near the floor and a raised position suitable, for example, for feeding a handicapped individual seated in the seat assembly.

2. Background of the Invention

A standard wheelchair is perhaps the most common wheeled support structure for handicapped individuals. Although wheelchairs are commonly designed to be readily adaptable to accommodate individuals of different sizes and shape, they often lack the contoured support needed to properly anatomically align and support the occupant, especially severely handicapped children. Further, standard wheelchairs frequently have complicated adjustment mechanisms in order to accommodate individuals of different sizes and weights, and frequently fail to provide any means for varying the spatial orientation of the occupant without disturbing a therapeutically desired seating posture.

Another type of wheeled support structure, although not specifically designed for handicapped individuals, is a baby stroller. A wide variety of baby strollers are presently available, but most do not satisfactorily combine the desirable characteristics of a wheeled seat support or stroller for a handicapped individual. Baby strollers are generally designed to function as temporary portable wheeled structures for babies and small children. Such strollers are usually engineered to be of a light construction and often include intricate folding mechanisms which would be unduly cumbersome if enlarged to a size necessary for a wheeled support structure or stroller for older children, such as handicapped children up to adolescence or young adult ages. Baby strollers generally lack any contoured support of the type needed to properly anatomically align and support a handicapped child, especially if the child spends a significant portion of the day in the stroller. Nor do they permit easy tilting of the seat for the child's comfort.

Strollers designed for handicapped children do not provide for easy height adjustment. It would be desirable to have a stroller which can be easily lowered to a position close to the floor so that the child can be near other children at play. It also would be desirable to be able to easily raise the height of the child in the stroller to a position near table height for feeding the child. Also, the positioning and support of the child should be easily adjusted between reclining and upright positions at the different seat heights.

BRIEF SUMMARY OF THE INVENTION

The invention is directed to a stroller suitable for use by handicapped children and to an adjustable height base for such a stroller. According to the invention, a stroller base is designed primarily for indoor use. The base has a generally rectangular frame with four small wheels, at least two of which are swivel or caster wheels. The base includes two spaced, parallel seat mounting members to which a seat assembly is releasably attached. The seat mounting members are located on opposite sides of the base. A scissors mechanism is connected between the base and the two seat mounting members to permit simultaneously raising and lowering the seat mounting members. A locking gas spring also is connected between the base and the seat mounting members for imparting a lifting force on the seat mounting members while adjusting the height of the seat assembly and for locking the vertical position of the seat assembly. Optionally, the seat assembly may be removed from the stroller base and placed on a separate base suitable for pushing and for use outdoors.

Accordingly, it is an object of the invention to provide a stroller suitable for use with handicapped children which has an adjustable height base.

Other objects and advantages of the invention will become apparent from the following detailed description of the invention and the accompanying drawings.

DETAILED DESCRIPTION OF THE INVENTION

Figure 1:
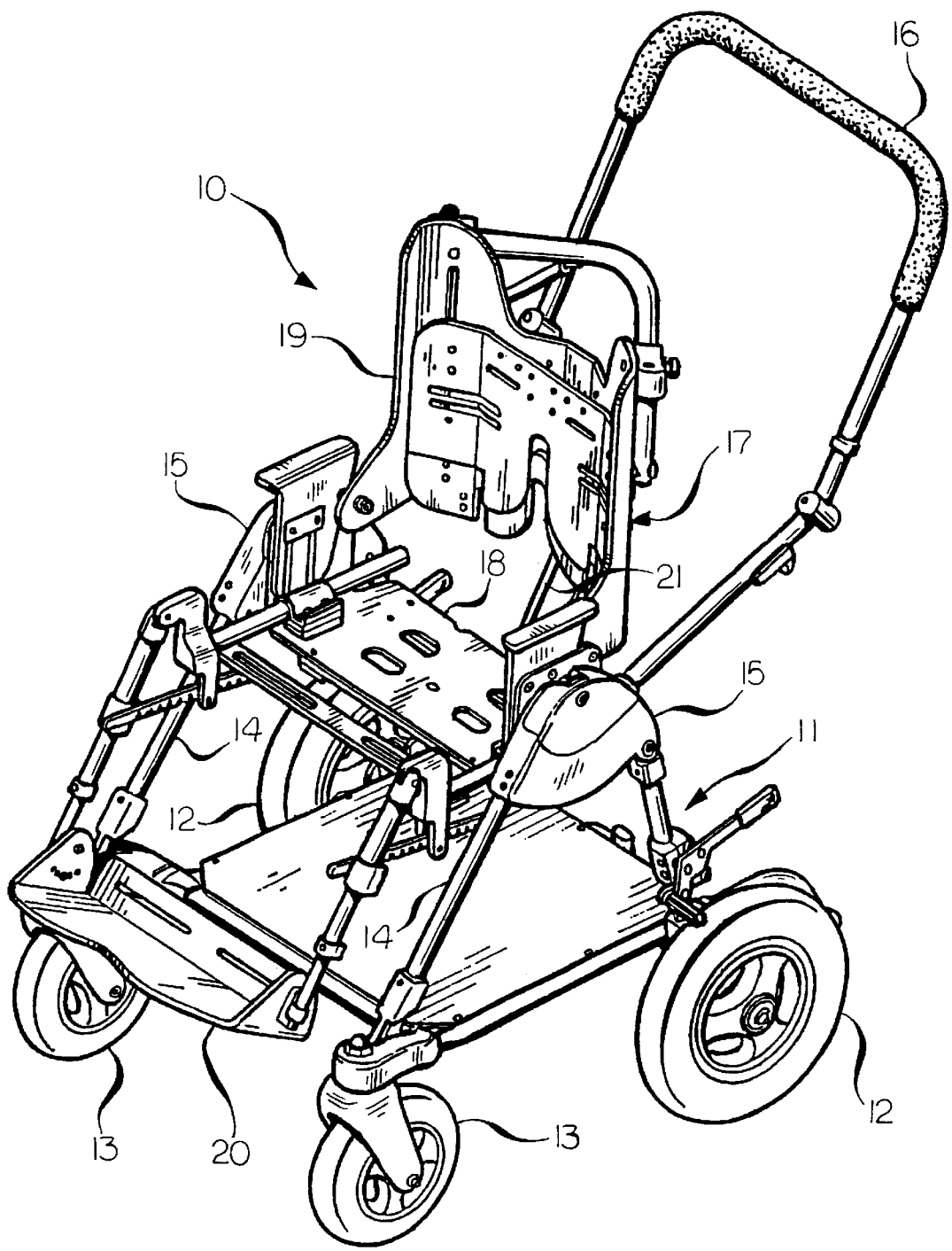
FIG. 1 is a perspective view of a stroller including a seat assembly mounted on a wheeled first stroller base for tilting to different positions.
Figure 2:
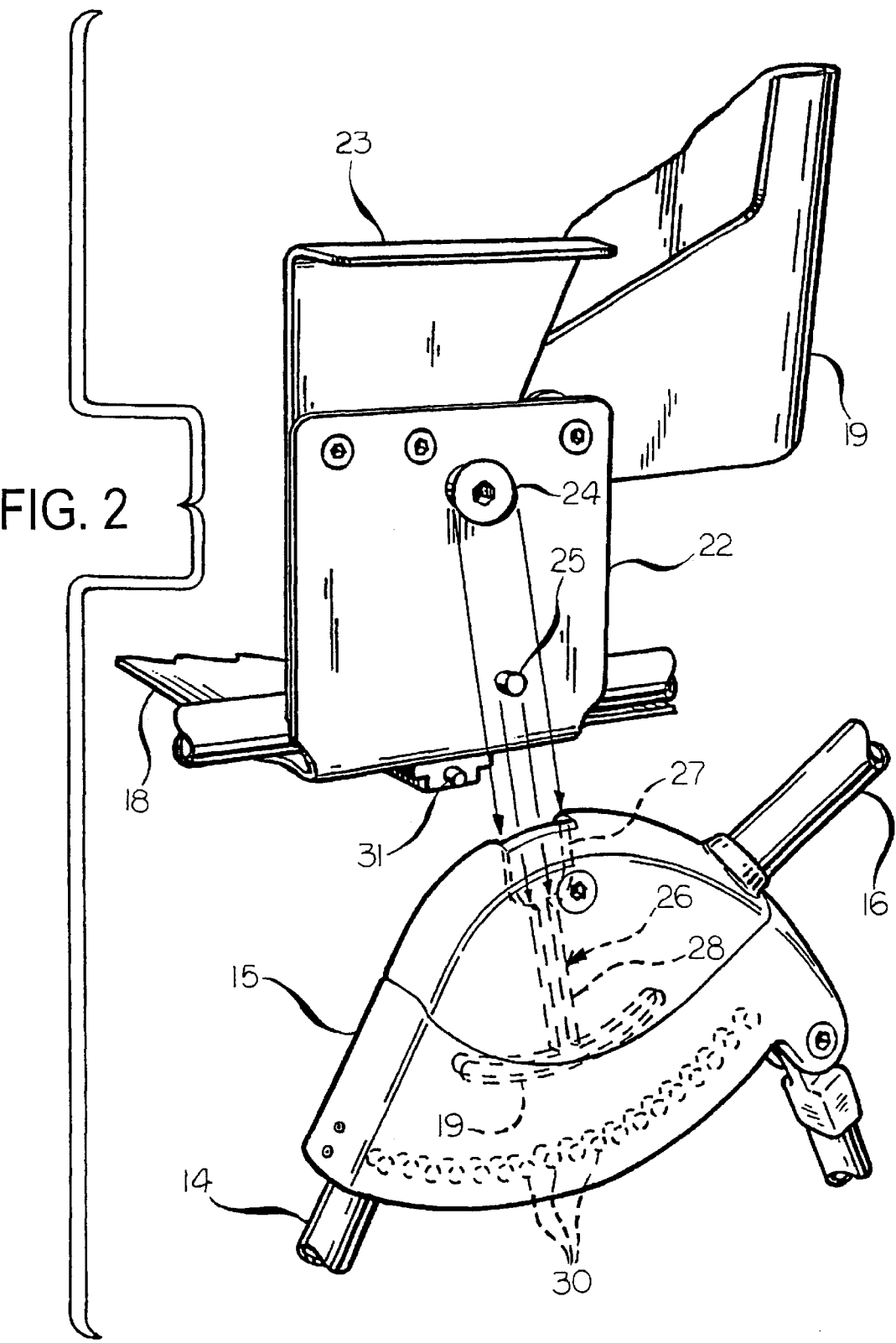
FIG. 2 is an enlarged fragmentary exploded perspective view showing details of the mechanism for attaching and for adjusting the position of the stroller seat assembly on the first stroller base.
Figure 3:
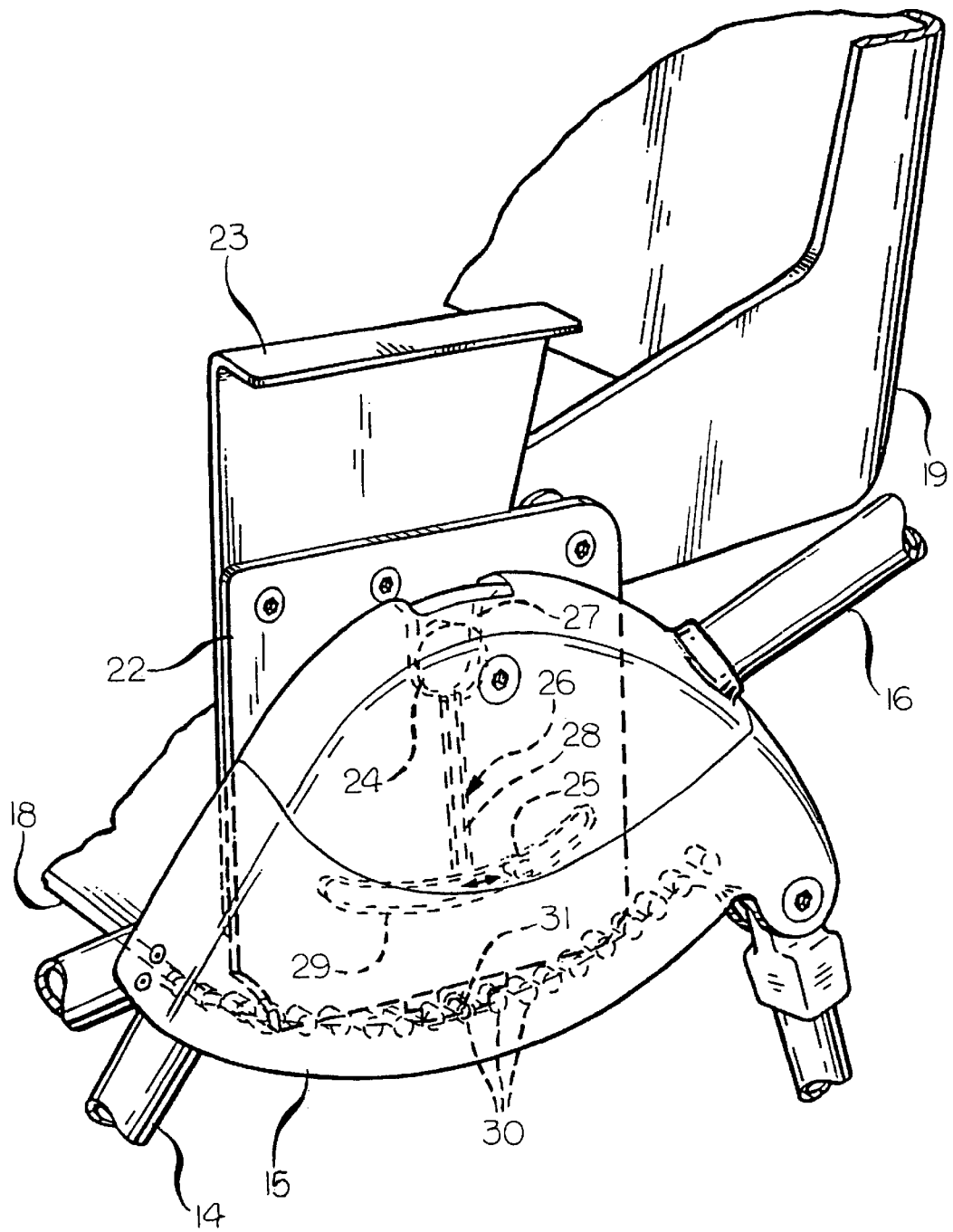
FIG. 3 is an enlarged fragmentary perspective view similar to FIG. 2, but showing the seat assembly attached to the first stroller base.

Referring to FIGS. 1–3, a stroller 10 of a type designed for use with handicapped children is illustrated. The stroller 10 has a fixed height base 11 which has a pair of axially aligned rear wheels 12 and a pair of front swivel wheels 13. The base 11 also has two spaced, parallel side frames 14. The illustrated side frames 14 are generally triangular and each have an upper seat mounting member 15. A handle assembly 16 is secured to the seat mounting members 15 on the two side frames 14. The handle assembly 16 extends to the rear of the stroller 10 for pushing the stroller 10 and may be adjustable to accommodate different height users.

A seat assembly 17 is releasably secured between the seat mounting members 15 on the two side frames 14. The seat assembly 17 includes a seat shell 18, a seat back shell 19, and a footrest 20. Adjustments are provided for seat back shell 19 and for the footrest 20 to accommodate different size children. The angle of the footrest 20 also may be adjusted. The seat back shell 19 may be mounted to pivot on the seat shell 18. A seat back adjustment mechanism 21 permits adjusting the angle of the seat back shell 19 relative to the seat shell 18 and locks the set position.

Pads (not shown) are secured to the seat shell 18 and the seat back shell 19 for the comfort of the child. The pads may be shaped and sized to provide any needed support for the child, and to accommodate the child's disabilities. The pads may be attached to the shells 18 and 19 by any convenient means, such as with Velcro fasteners (not shown). As the child grows or as the child's abilities change, the pads may be changed and their positions adjusted to accommodate the child. Also, a seat belt (not shown) may be provided for securing the child in the stroller 10.

As shown in FIGS. 2 and 3, the seat assembly 17 is releasably mounted on the base 11 so that its tilt or angular position can be adjusted for the comfort of the child. For example, the seat assembly 17 may be set to an upright position when the child is awake, as shown in FIG. 1, or tilted back when the child is sleeping. The seat shell 18 has upwardly bent end plates 22 which are spaced to extend between and to be close to the seat mounting members 15. An adjustable height armrest 23 is secured to each end plate 22. A headed pivot post 24 and a retaining pin 25 are secured to each end plate 22. The seat mounting member 15 has a generally vertical slot 26 having an enlarged upper end 27 sized to receive and support the pivot post 24 and a narrower lower end 28 sized to receive the retaining pin 25.

The seat assembly 17 is mounted on the seat mounting member 15 by lowering the seat assembly 17 so that the retaining pin 25 on each end plate 22 enters the slot 26 until the pivot post 24 enters and is retained by the upper end 27 of the slot 26. The pivot post 24 then defines an axis of rotation for the seat assembly 17 on the base 11. An arcuate slot 29 is located at the bottom of the lower end 28 of the slot 26 for receiving the retaining pin 25. The arcuate slot 29 has a center located at the center of the pivot post 24. Consequently, as the seat assembly 17 is tilted, the retaining pin 25 cooperates with the arcuate slot 29 to retain the pivot post 24 in the upper slot end 27 and also to limit the degree of rotation of the seat assembly 17. The seat assembly 17 can only be lifted from the base 11 when the retaining pin 25 is positioned in the arcuate slot 29 in alignment with the slot 26.

A plurality of blind holes 30 are formed in each seat mounting member 15. The holes 30 are spaced along an arc which is centered with the axis of rotation of the seat post 24. The seat assembly 18 includes a spring loaded locking pin 31 which is positioned to selectively engage the holes 30. The angular position of the seat assembly 18 is adjusted by retracting the locking pin 31, adjusting the tilt of the seat assembly 18, and inserting the locking pin 31 in the closest one of the spaced holes 30. As the seat assembly 18 is tilted, the angle between the seat shell and the seat back shell 19 is maintained by the seat back adjustment mechanism 21.

Additional details of the design and construction of the stroller 10 are shown in U.S. Pat. No. 6,086,086 filed May 11, 1999 which is incorporated herein by reference.

Figure 4:
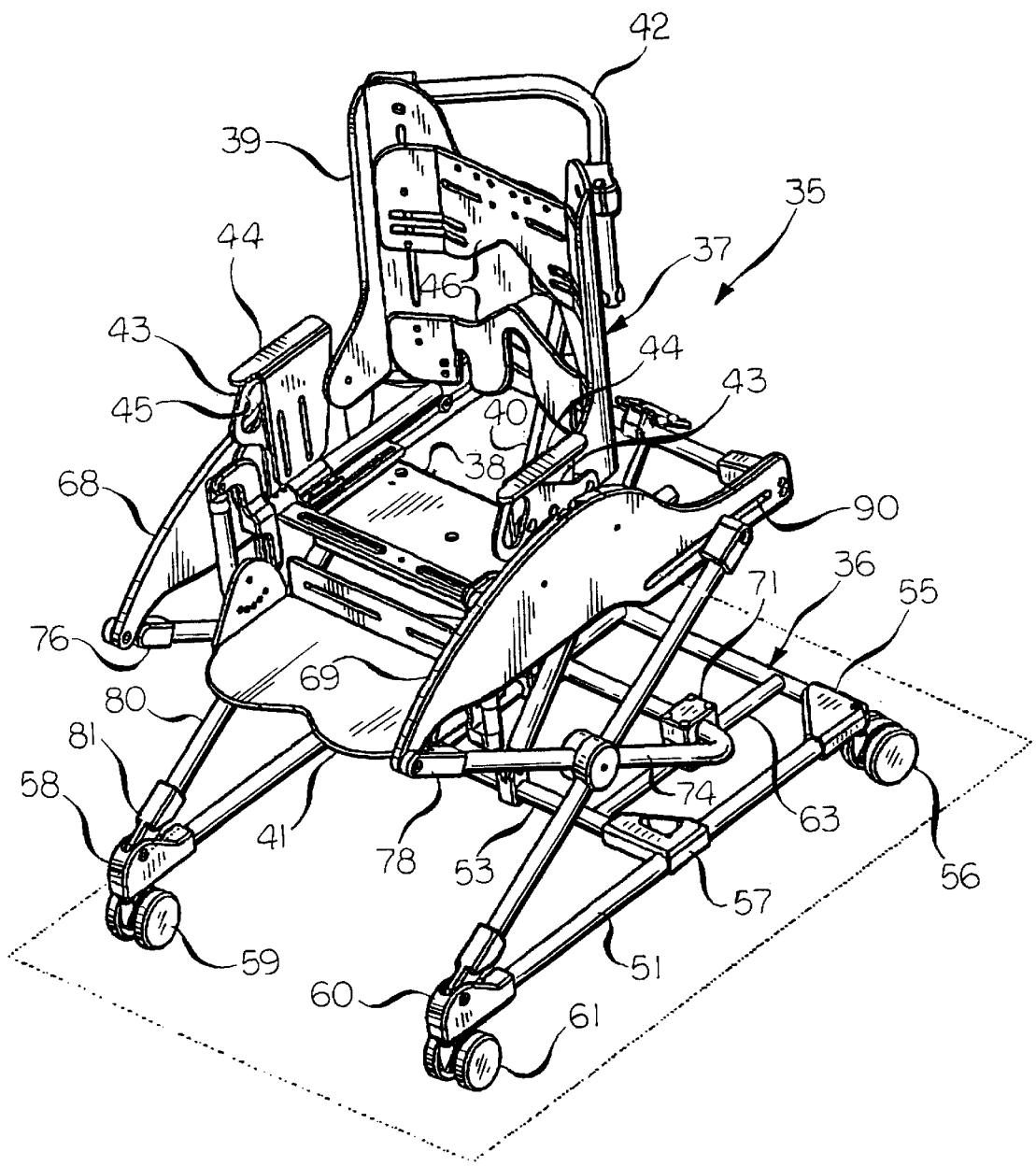
FIG. 4 is a perspective view of a stroller comprising a seat assembly and an adjustable height second stroller base according to the invention with the second stroller base set at an intermediate height position.
Figure 5:
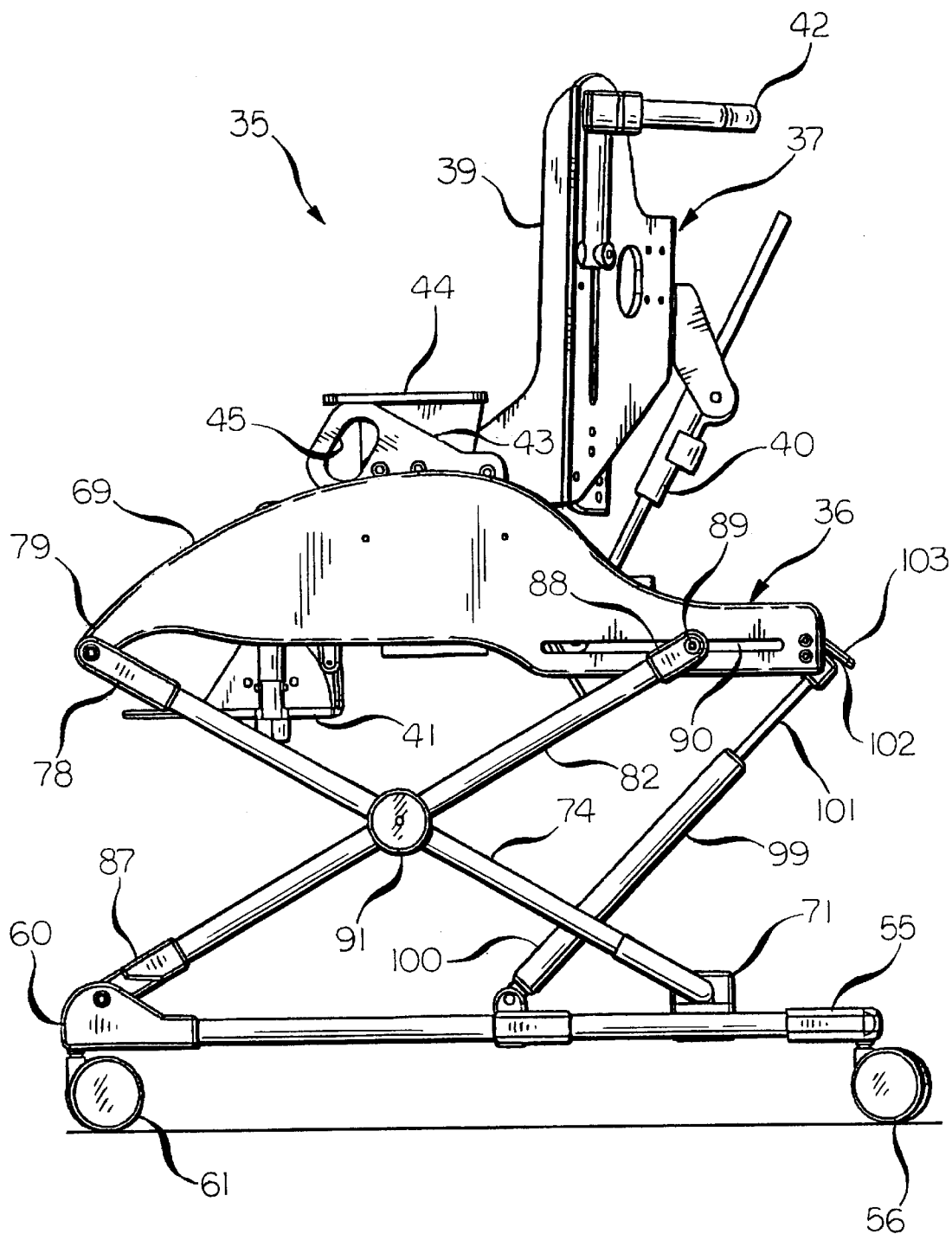
FIG. 5 is a side elevational view of the stroller with the second stroller base set at the intermediate height position.
Figure 6:
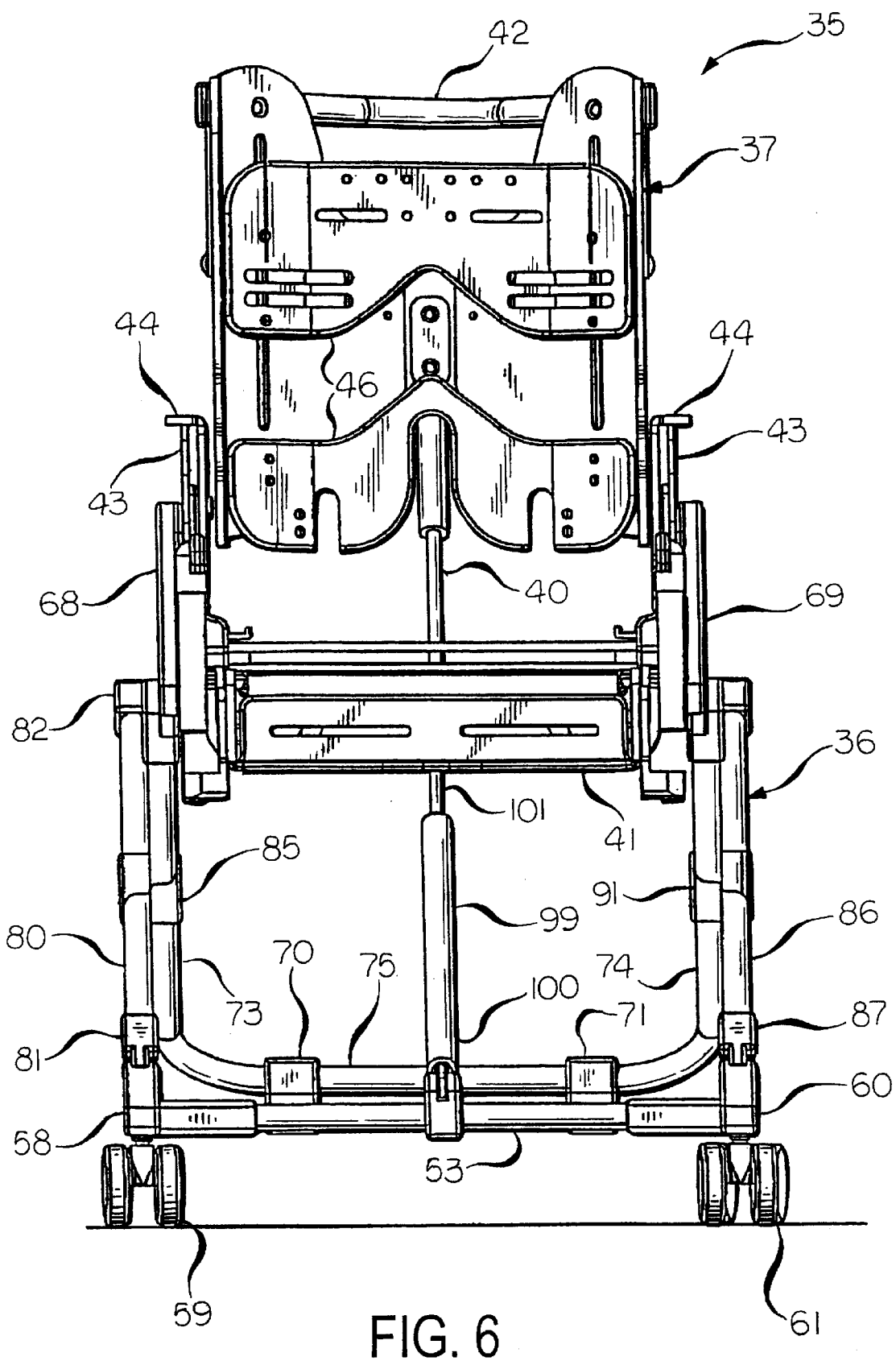
FIG. 6 is a front elevational view of the stroller with the second stroller base set at the intermediate height position.

FIGS. 4–6 show details of a stroller 35 according to the invention. The stroller 35 is designed primarily for indoor use. However, it may be used for limited outdoor use, such as on a porch or driveway. The stroller 35 is designed to have an easily adjusted height. It may be lowered so that a child in the stroller 35 is close to the floor to be near other children during play, or it may be raised so that the child is near table height during feeding or other activities. On the other hand, the stroller 10 has a fixed height and relatively large wheels which facilitate pushing over varied terrain.

Figure 13:
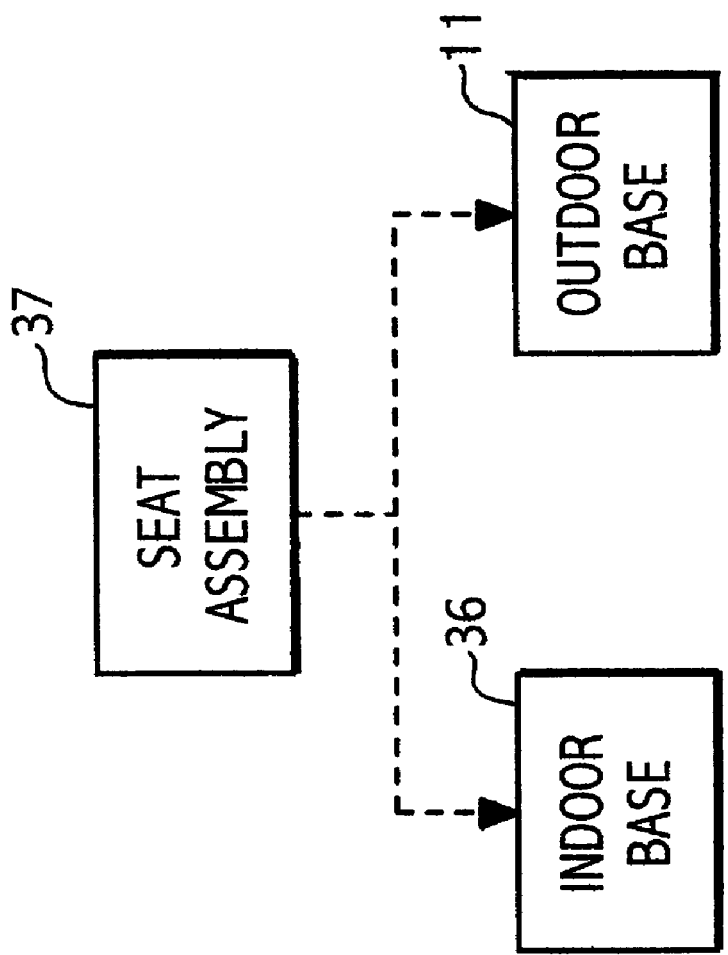
FIG. 13 is a diagrammatic representational view of a seat assembly that is adapted to be attached to two bases.

The stroller 35 includes a seat assembly 37 which may be identical to the seat assembly 17 of FIG. 1. The seat assembly 37 includes a seat shell 38, a seat back shell 39 which is pivotally attached to the seat shell 38, a seat back adjustment mechanism 40 which locks the angular orientation between the seat shell 38 and the seat back shell 39, and an adjustable footrest 41. A handle 42 is shown attached to the seat back shell 39 which is suitable for pushing the stroller 35 around a room or home. The seat shell 38 has two spaced, parallel upturned end plates 43. An adjustable height armrest 44 is mounted on each end plate 43. The end plates 43 also may include an opening 45 for attaching a restraining belt or harness. Finally, each end plate 43 includes a pivot post, a retaining pin and a spring loaded locking pin (not shown) identical to the pivot post 24, retaining pin 25 and locking pin 31 shown in FIGS. 2 and 3 so that the seat assembly 37 can be attached to either the base 36 or the base 11, as diagrammatically illustrated in FIG. 13.

As with the seat assembly 17, pads (not shown) are attached to the seat shell 38 and to the seat back shell 39 to accommodate the needs of the child who will be placed in the stroller 35. The seat back pads are attached to one or more adjustable panels 46 on the seat back shell 39 which may be adjusted in height to accommodate the child. The pads may be customized to provide the support needed by the child based upon the child's strengths and disabilities. Also, the pads may be replaced as the child grows to accommodate the child's changing needs. Supporting and positioning pads are well known and not a part of the present invention.

FIGS. 4–12 show details of a base 36 for the stroller 35. The base 36 includes a frame 49 having right and left parallel spaced side tubes 50 and 51, respectively. The side tubes 50 and 51 are connected together by a rear cross tube 52 and by an intermediate cross tube 53. The right side tube 50 is connected to the rear cross tube 52 with a rear caster block 54 and the left side tube 51 is connected to the rear cross tube 52 with a rear caster block 55. Each rear caster block 54 and 55 mounts a rear locking caster wheel 56. The intermediate cross tube 53 may be welded to the side tubes 50 and 51, or may be secured with blocks 57. A front caster wheel mounting block 58 having an attached front caster wheel 59 is mounted on a front end of the right side tube 50 and a front caster wheel mounting block 60 having an attached caster wheel 61 is mounted on a front end of the left side tube 51. Right and left parallel height adjustment tubes 62 and 63 are secured between the rear cross tube 52 and the intermediate cross tube 53.

The base 36 has two seat mounting members: a right member 68 and a left member 69. The height of the seat mounting members 68 and 69 above the frame 49 is adjustable. Over the range of adjustment, the seat mounting members 68 and 69 are maintained parallel and the same height above the frame 49. A scissors mechanism is provided for keeping the seat mounting members 68 and 69 parallel and at the same height during height adjustment and limiting the seat mounting members 68 and 69 to move in a substantially vertical direction relative to the frame 49.

A right slide block 70 is mounted to slide in an axial direction along the right height adjustment tube 62 and a left slide block 71 is mounted to slide in an axial direction along the left height adjustment tube 63 of the frame 49. A U-shaped tube 72 is provided having a right side 73 and a left side 74 connected by a lower connecting portion 75. The lower connecting portion 75 of the tube 72 is attached to the slide blocks 70 and 71, while being free to rotate. A free upper end of the right side 73 of the tube 72 is pivotally connected with a coupler block 76 to a front end 77 of the right seat mounting member 68. Similarly, a free upper end of the left side 74 of the tube 72 is pivotally connected with a coupler block 78 to a front end 79 of the left seat mounting member 69. The U-shaped tube 72 permits simultaneously raising and lowering the front ends 77 and 79 of the seat mounting members 68 and 69.

A right diagonal support tube 80 has a lower front end 81 which is pivotally connected to the right front caster block 58. An upper rear end of the tube 80 is attached to a top slide coupler 82. The slide coupler 82 has a slide peg 83 which is retained in but free to slide along a slot 84 in the right seat mounting member 68. A scissors pivot block 85 pivotally connects central portions of the right side 73 of the U-shaped tube 72 and the right diagonal support tube 80. Similarly, a left diagonal support tube 86 has a lower end 87 which is pivotally connected to the left front caster block 60. An upper rear end of the tube 86 is attached to a top slide coupler 88. The slide coupler 88 has a slide peg 89 which is retained in but free to slide along a slot 90 in the left seat mounting member 69. The slots 84 and 90 extend parallel to the frame 49. A scissors pivot block 91 pivotally connects central portions of the left side 74 of the U-shaped tube 72 and the left diagonal support tube 86.

A rear cross tube 95 is secured with two coupler blocks 96 to extend between a rear end 97 of the right seat mounting member 68 and a rear end 98 of the left seat mounting member 69. A locking gas spring 99 has a housing 100 which is pivotally attached to the intermediate cross tube 53 on the frame, and has an extendable rod 101 which is pivotally secured to the rear cross tube 95. The locking gas spring 99 is a commercially available product which is available in different lengths, with different gas spring forces, and with different types of release mechanisms for the lock. In the illustrated locking gas spring 99, a release button 102 (FIG. 5) is mounted on the end of the rod 101 which is secured to the rear cross tube 95. A lock release plate 103 is mounted on the rear cross tube 95 with a hinge. When the lock release plate 103 is manually pressed, the release button 102 is pressed to unlock the locking gas spring 99. When released, the rod 101 may be pushed into the housing 100 against an opposing force of a gas spring. For the stroller base 36, the released gas spring 99 may exert a force between about 40 to about 60 pounds (between about 18 to about 27 kilograms). Alternately, a locking gas spring 99 may be selected to provide a force which substantially counteracts the weight of the seat assembly 37 and the child to be placed in the seat assembly 37.

A right side seat mounting plate 104 is attached to the seat mounting member 68 and a left side seat mounting plate 105 is attached to the seat mounting member 69. The seat mounting plates 104 and 105 are mirror images of each other and are mounted on the seat mounting members 68 and 69 to be in alignment with each other. The end plates 43 on the seat shell 38 are each provided with a pivot post 24, a retaining pin 25 and a releasable locking pin 31 similar to those on the end plates 22 for the seat shell 18. Each seat mounting plate 104 and 105 has a generally vertical slot 106 sized to receive a retaining pin 25 when the seat assembly 37 is inserted between the seat mounting members 68 and 69. The slot 106 has an enlarged upper end 107 sized for receiving and supporting a pivot post 24. Preferably, the enlarged upper end 107 is a T-slot which captures a head on the pivot post 24 to retain the pivot post 24 in the upper end 107. The slot 106 terminates at an arcuate slot 108 which is located on a radius from and is spaced from the enlarged upper end 107 for receiving the retaining pin 25 when the pivot post 24 is in the enlarged upper end 107. A plurality of holes 109 are formed in the seat mounting plates 104 and 105 along a radius from the axis of rotation of the pivot post 24 in the enlarged upper end 107. The holes 109 are arranged to receive the locking pin 31.

Figure 10:
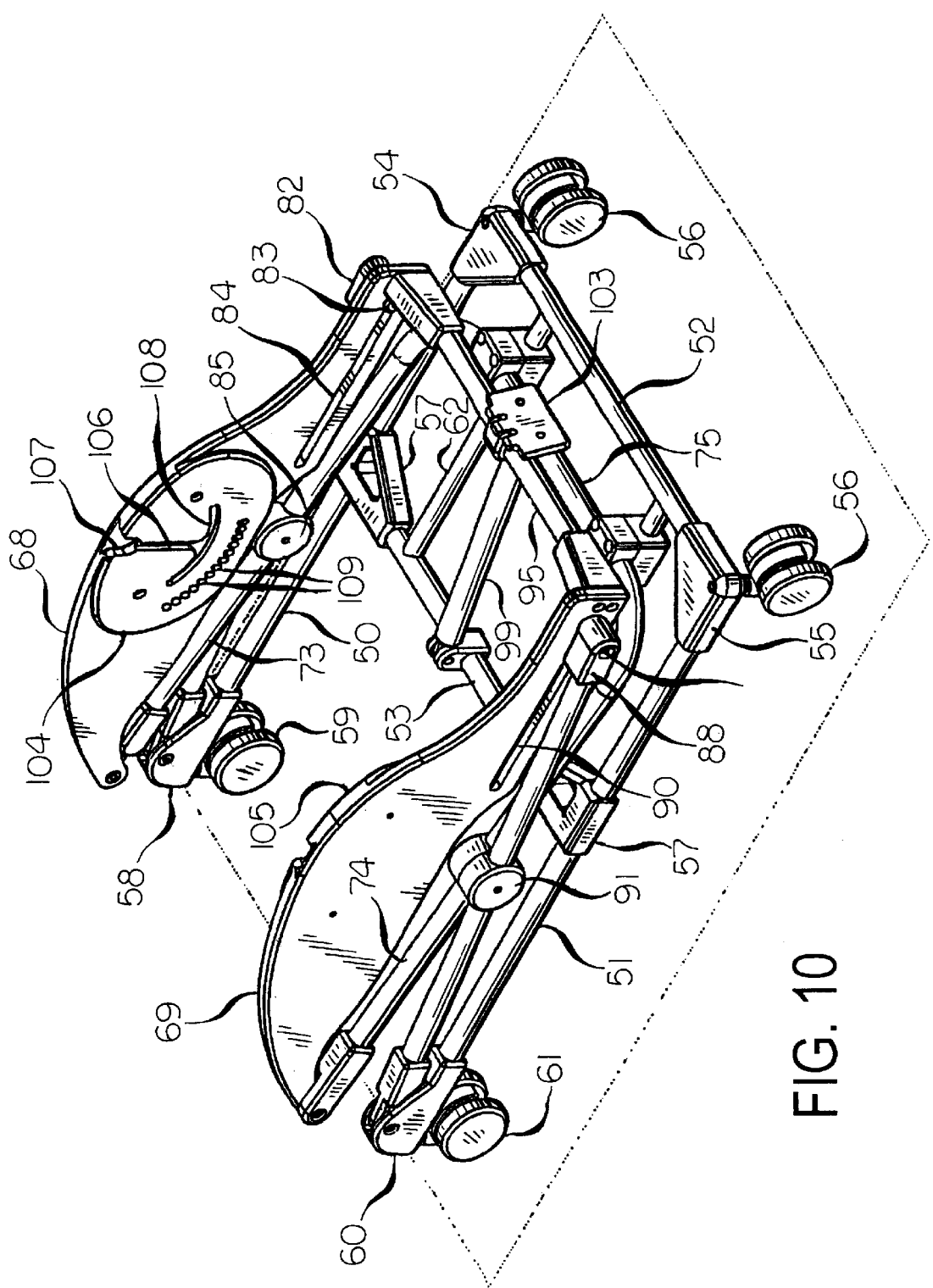
FIG. 10 is a perspective view of the second stroller base of the invention with the second stroller base set in a collapsed or folded position.
Figure 11:
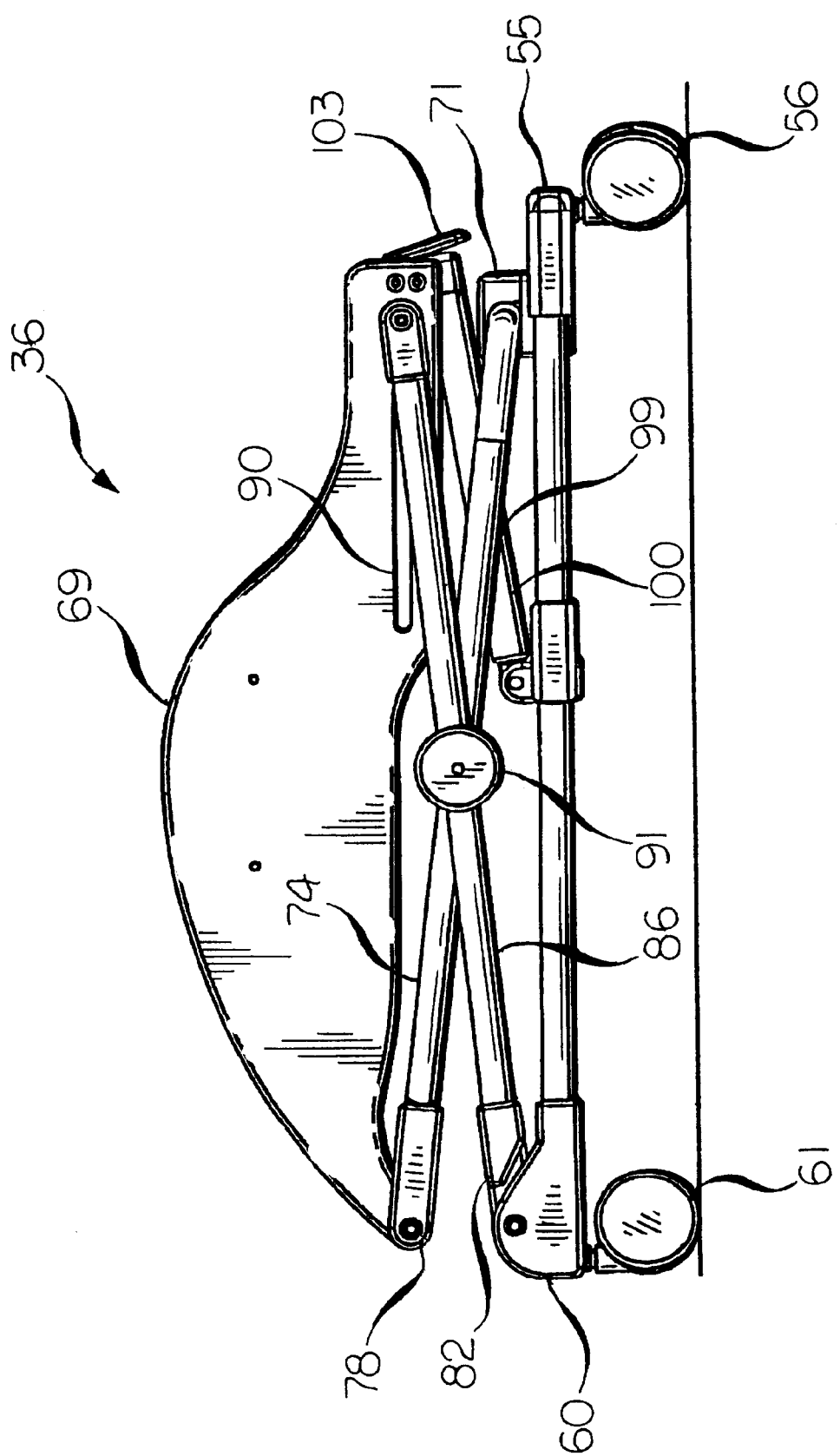
FIG. 11 is a side elevational view of the second stroller base in the collapsed or folded position.
Figure 12:
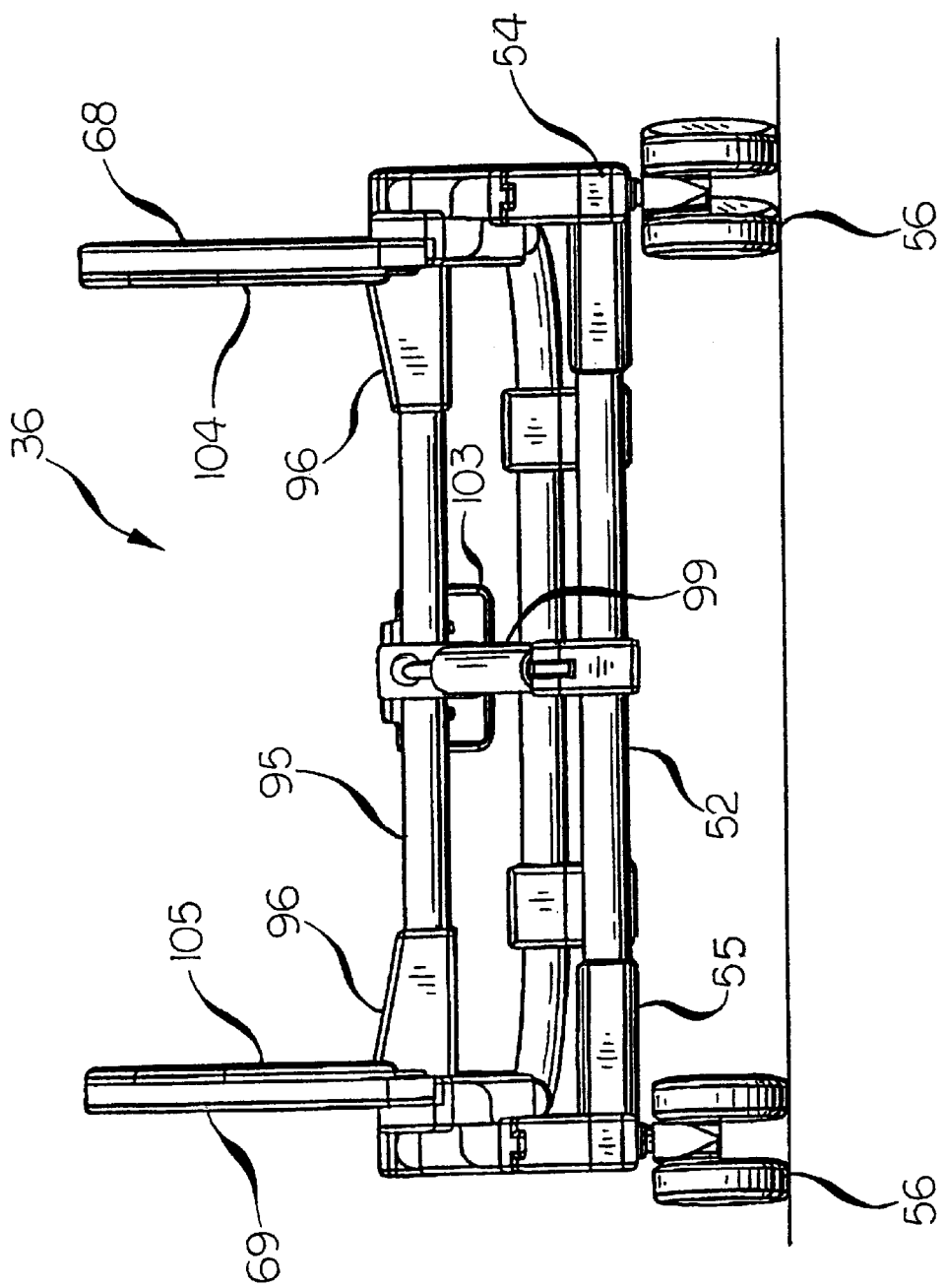
FIG. 12 is a front elevational view of the second stroller base in the collapsed or folded position.

In operation, the seat assembly 37 is secured to the base 36. Although not shown, the seat assembly 37 is provided with suitable padding for supporting and positioning the child who will use the stroller 35. The child may then be positioned in the seat assembly 37 and, preferably, secured with a seat belt or with a harness. The height of the seat assembly 37 may be adjusted either prior to or after placing the child in the stroller. The height of the seat assembly 37 is adjusted by manually pressing the lock release plate 103 and raising to an uppermost position for the base 36, as shown in FIGS. 6–9, or lowering the seat assembly 37 to a lowermost position for the base 36, as shown in FIGS. 10–12, or to any desired intermediate position, as shown in FIGS. 4 and 5. Once a desired position is selected, the lock release plate 103 is released to engage the lock in the locking gas spring 99.

Figure 7:
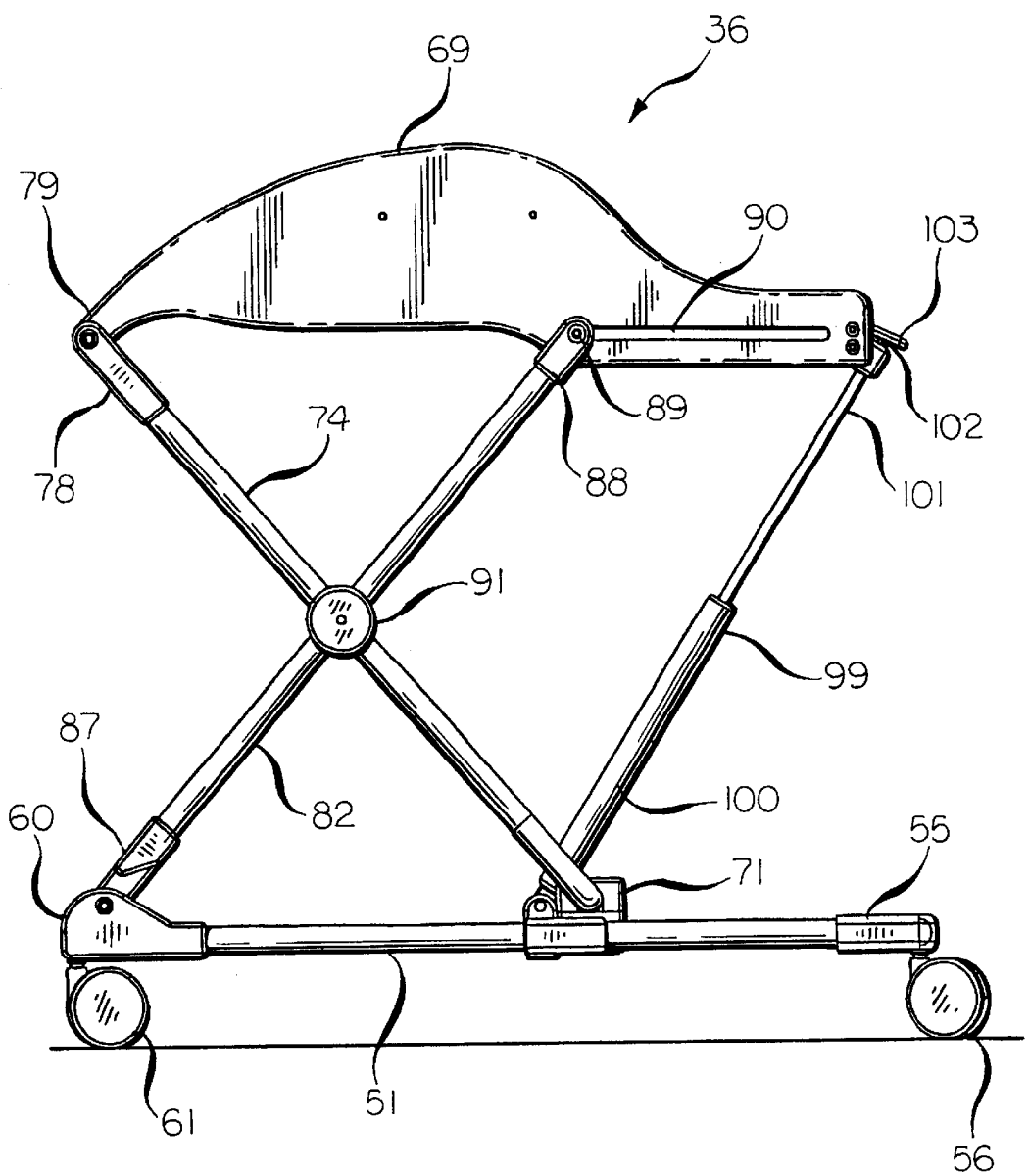
FIG. 7 is a side elevational view showing the second stroller base of the invention with the second stroller base set in a maximum height position.
Figure 8:
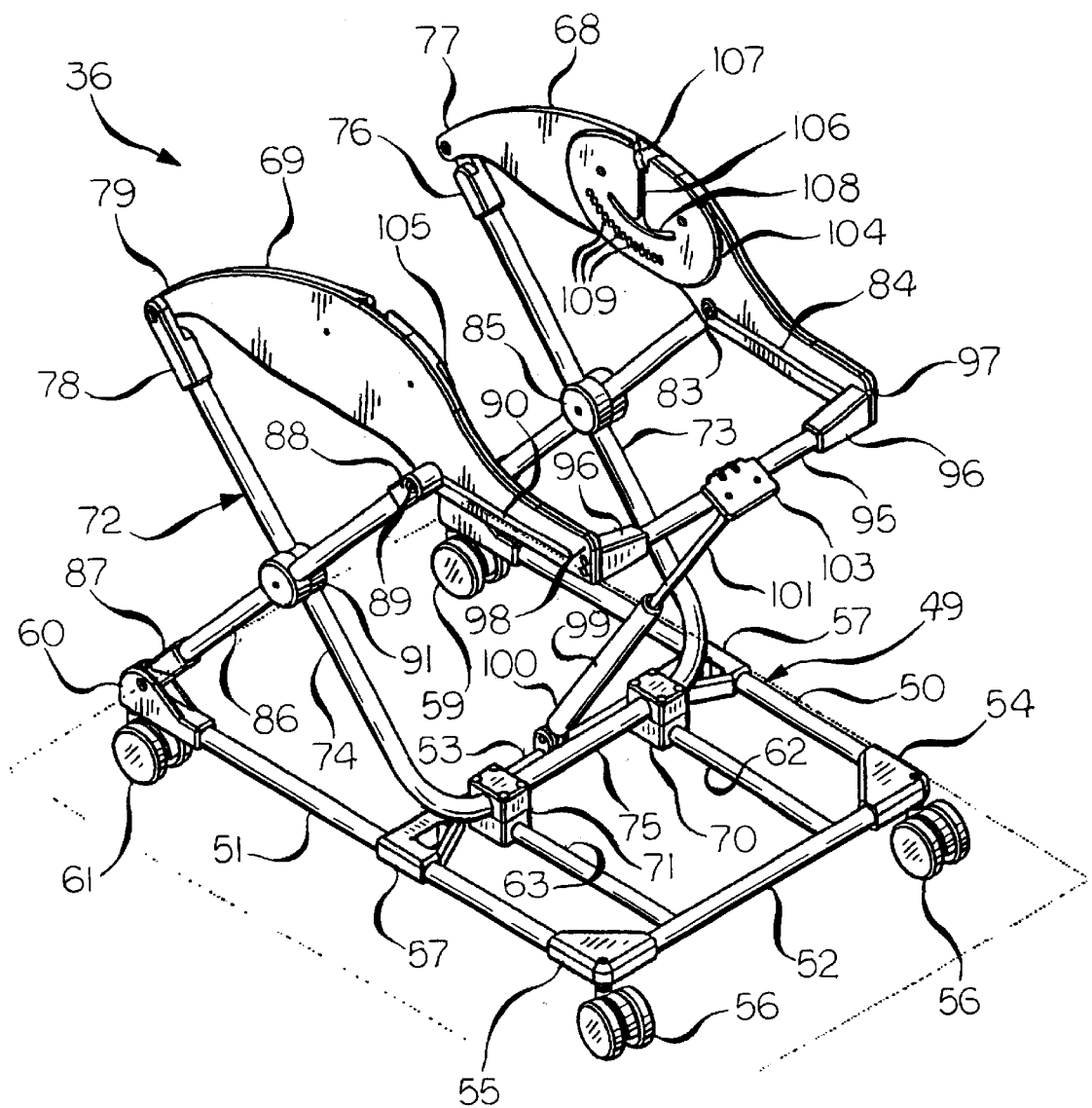
FIG. 8 is a perspective view of the second stroller base with the second stroller base set in the maximum height position.
Figure 9:
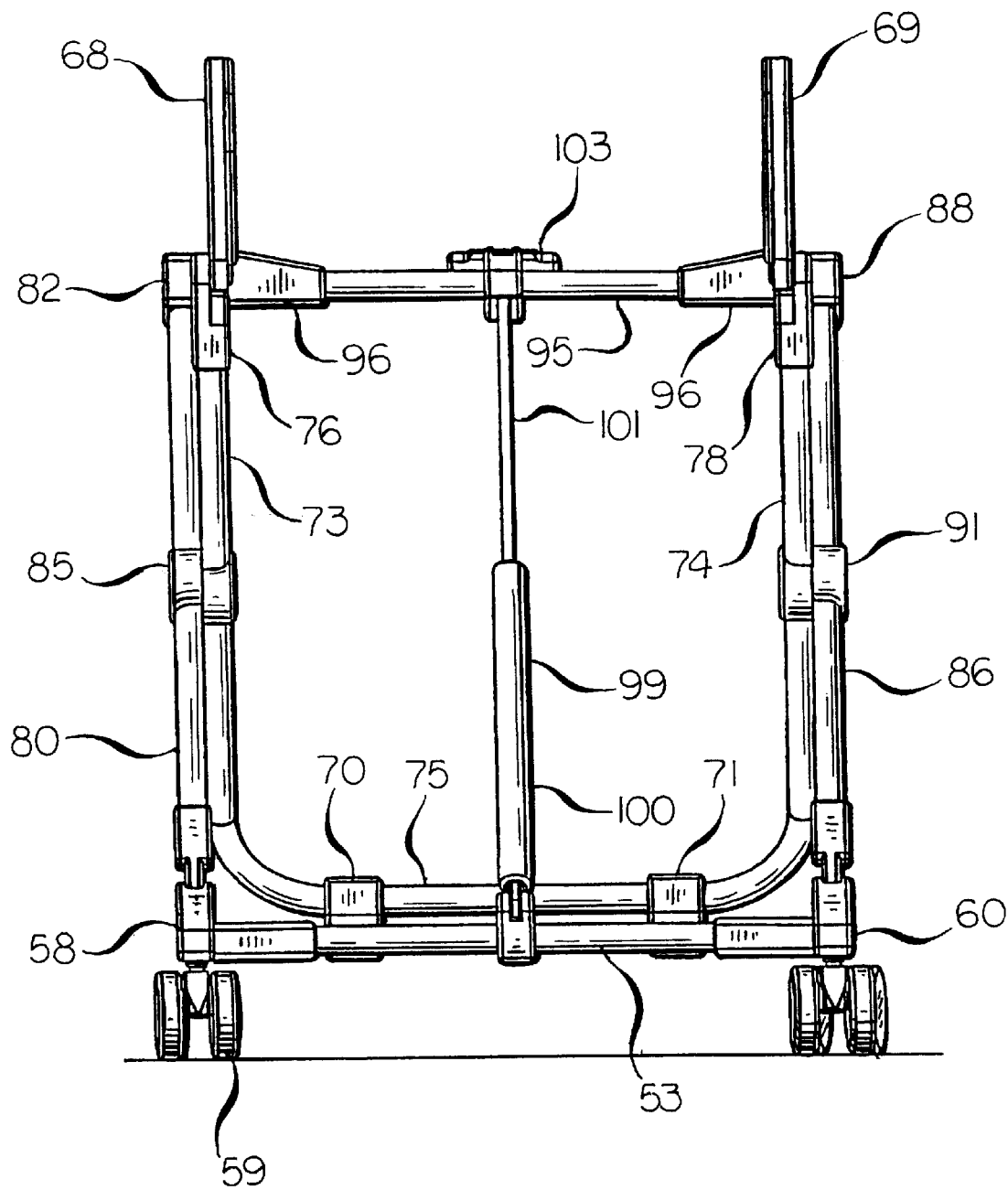
FIG. 9 is a front elevational view of the second stroller base with the second stroller base set in the maximum height position.

As best seen by comparing FIGS. 5, 7 and 11, as the seat mounting members 68 and 69 are lowered, the slide blocks 70 and 71 slide on the height adjustment tubes 62 and 63, respectively, towards the rear cross tube 52 and the pegs 83 and 89 move towards the rear of the slots 84 and 90, respectively. When the seat mounting members 68 and 69 are raised, the slide blocks 70 and 71 slide forwards on the height adjustment tubes 62 and 63, respectively, and the pegs 83 and 89 move forwards in the slots 84 and 90, respectively. During this movement, the seat mounting members 68 and 69 remain aligned and an attached seat assembly 37 maintains its preset tilt. It is desirable to select the force of the locking gas spring 99 to more than counteract the weight of the seat assembly 37 and the child when placed in the seat assembly 37. This will prevent any sudden drop of the seat assembly 37 when the release plate 103 is pressed to release the lock on the locking gas spring 99. Some effort is then used to push the seat assembly 37 to a lower position while the locking plate 103 is pressed.

It will be appreciated that various modifications and changes may be the above described preferred embodiment of a stroller and a base for a without departing from the scope of the following claims.

What is claimed is:
1. A stroller, comprising:
   a seat assembly adapted to receive a child;
   a base for mounting said seat assembly, said base including a frame, a plurality of wheels attached to said frame;

a seat mount adapted to mount said seat assembly on said base;

an adjustable height mechanism positioned between said seat mount and said frame, said adjustable height mechanism including a scissors mechanism connected between said seat mount and said frame, said scissors mechanism limiting said seat mount to move in a vertical direction relative to said frame; and a locking gas spring connected between said seat mount and said frame, wherein said locking gas spring has a locked setting for preventing changes in the vertical position of said seat mount relative to said frame and a released setting for permitting changes in the vertical position of said seat mount relative to said frame.

2. A stroller as set forth in claim 1, wherein said seat mount releasably mounts said seat assembly on said base via a pivot post retained by a slot.

3. A stroller, comprising:

a seat assembly adapted to receive a child;

a base for mounting said seat assembly, said base including a frame, a plurality of wheels attached to said frame;

a seat mount adapted to releasably mount said seat assembly on said base, wherein said seat mount releasably mounts said seat assembly on said base, said seat mount including a mechanism adapted to secure said seat assembly on said base at a plurality of different seat angles relative to said base;

an adjustable height mechanism positioned between said seat mount and said frame, said adjustable height mechanism including a scissors mechanism connected between said seat mount and said frame, said scissors mechanism limiting said seat mount to move in a vertical direction relative to said frame; and a locking gas spring connected between said seat mount and said frame, wherein said locking gas spring has a locked setting for preventing changes in the vertical position of said seat mount relative to said frame and a released setting for permitting changes in the vertical position of said seat mount relative to said frame.

4. In combination:

a seat assembly adapted to receive a child, a first stroller base and a second stroller base, said first stroller base having a mount for releasably attaching said seat assembly to said first base, at least four wheels and a handle for use in pushing said first base, said second base having a mount for releasably attaching said seat assembly to said second base, an adjustment mechanism adapted for raising and lowering the height of the seat assembly when attached to said second base, and at least four wheels, wherein said adjustment mechanism limits said mount to move in a vertical direction.

5. A stroller, comprising:

a seat assembly adapted to receive a child;

a base for mounting said seat assembly, said base including a frame, a plurality of wheels attached to said frame;

a seat mount adapted to mount said seat assembly on said base;

an adjustable height mechanism positioned between said seat mount and said frame, said adjustable height mechanism including a scissors mechanism connected between said seat mount and said frame, said scissors mechanism limiting said seat mount to move in a vertical direction relative to said frame; and a locking gas spring connected between said seat mount and said frame, wherein said locking gas spring is capable of locking said stroller in a first vertical position of said seat mount relative to said frame and a second vertical position of said seat mount relative to said frame, said second vertical position being different than said first vertical position.

6. A stroller as set forth in claim 5, wherein said seat mount releasably mounts said seat assembly on said base via a pivot post retained by a slot.

7. A stroller, comprising:

a seat assembly adapted to receive a child;

a base for mounting said seat assembly, said base including a frame, a plurality of wheels attached to said frame;

a seat mount adapted to releasably mount said seat assembly on said base, said seat mount including a mechanism adapted to secure said seat assembly on said base at a plurality of different seat angles relative to said base;

an adjustable height mechanism positioned between said seat mount and said frame, said adjustable height mechanism including a scissors mechanism connected between said seat mount and said frame, said scissors mechanism limiting said seat mount to move in a vertical direction relative to said frame; and a locking gas spring connected between said seat mount and said frame, wherein said locking gas spring is capable of locking said stroller in a first vertical position of said seat mount relative to said frame and a second vertical position of said seat mount relative to said frame, said second vertical position being different than said first vertical position.

8. A stroller, comprising:

a seat assembly adapted to receive a child, said seat assembly including a seat shell and a seat back shell;

a base for mounting said seat assembly, said base including a frame, a plurality of wheels attached to said frame;

seat mounts adapted to mount said seat assembly on said base so that said seat shell is between said mounts;

an adjustable height mechanism positioned between said seat shell and said frame, said adjustable height mechanism including a scissors mechanism connected between said seat shell and said frame, said scissors mechanism limiting said seat mounts to move in a vertical direction relative to said frame; and a locking gas spring connected between said seat mounts and said frame, wherein said locking gas spring has a locked setting for preventing changes in the vertical position of said seat mounts relative to said frame and a released setting for permitting changes in the vertical position of said seat mounts relative to said frame.

* * * * *